(12) United States Patent
Byrne

(10) Patent No.: US 12,039,023 B2
(45) Date of Patent: Jul. 16, 2024

(54) SYSTEMS AND METHODS FOR PROVIDING A CONTINUOUS BIOMETRIC AUTHENTICATION OF AN ELECTRONIC DEVICE

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 553 days.

(21) Appl. No.: 16/926,465

(22) Filed: Jul. 10, 2020

(65) Prior Publication Data
US 2022/0012317 A1   Jan. 13, 2022

(51) Int. Cl.
G06F 21/00   (2013.01)
G06F 21/32   (2013.01)
G06V 40/12   (2022.01)
G06V 40/16   (2022.01)
H04M 1/72463   (2021.01)
H04W 4/02   (2018.01)
H04W 4/12   (2009.01)

(52) U.S. Cl.
CPC .......... *G06F 21/32* (2013.01); *G06V 40/1365* (2022.01); *G06V 40/165* (2022.01); *G06V 40/172* (2022.01); *H04M 1/724631* (2022.02); *H04W 4/027* (2013.01); *H04W 4/12* (2013.01)

(58) Field of Classification Search
CPC .......... G06F 21/32; G06F 21/62; G06F 21/88; G06F 2221/2139; G06V 40/1365; G06V 40/165; G06V 40/172; G06V 10/17; G06V 40/70; H04M 1/72463; H04M 1/724631; H04M 1/72454; H04W 4/027; H04W 4/12; H04W 12/065; H04W 12/68; H04L 63/0861
See application file for complete search history.

(56) References Cited

U.S. PATENT DOCUMENTS

| 2011/0159850 A1* | 6/2011 | Faith ............... G06Q 30/0261 455/411 |
| 2013/0063274 A1* | 3/2013 | Nguyen ............ G06F 1/1694 340/669 |
| 2013/0223696 A1* | 8/2013 | Azar ................. G06V 40/16 382/118 |

(Continued)

*Primary Examiner* — Brandon Hoffman
*Assistant Examiner* — William A Corum, Jr.
(74) *Attorney, Agent, or Firm* — Lee & Hayes P.C.

(57) ABSTRACT

The present disclosure may describes systems and methods for continuous biometric authentication for an electronic device. A continuous biometric authentication may include biometric sensors, processing systems, biometric data, an accelerometer, and other input/output devices. An accelerometer or other input/output devices may be configured to capture information concerning an electronic device, such as an acceleration of the electronic device, and/or information concerning an area surrounding the electronic device, such as ambient light intensity. Based on captured information, a triggering event associated with, for example, a theft, a change in location, or a transfer of possession may be detected by a processing system. Once a triggering event occurs, systems of the present disclosure may initiate additional biometric authentication procedures.

20 Claims, 8 Drawing Sheets

(56) References Cited

U.S. PATENT DOCUMENTS

| | | | |
|---|---|---|---|
| 2014/0033299 A1* | 1/2014 | McGloin | G06F 21/60 |
| | | | 726/30 |
| 2014/0282868 A1* | 9/2014 | Sheller | G06F 21/316 |
| | | | 726/3 |
| 2015/0089674 A1* | 3/2015 | Clapham | G06F 21/00 |
| | | | 726/34 |
| 2018/0181777 A1* | 6/2018 | Todasco | H04W 12/126 |
| 2019/0042715 A1* | 2/2019 | Korus | H04W 4/021 |
| 2019/0130713 A1* | 5/2019 | Wen | H04W 4/027 |
| 2021/0227383 A1* | 7/2021 | Alameh | H04W 12/02 |

* cited by examiner

SYSTEMS AND METHODS FOR PROVIDING A CONTINUOUS BIOMETRIC AUTHENTICATION OF AN ELECTRONIC DEVICE

FIELD

Embodiments described herein generally relate to electronic devices, such as mobile phones, laptop computers, tablet computers, and electronic watches and, in particular, to systems, processes, and methods for securing electronic devices.

BACKGROUND

Modern electronic devices commonly include security features to prevent unauthorized access and/or to protect private files. Many security features permit a user to access an electronic device once a user input matches a stored password and/or previously registered biometric information.

Once requirements for a particular security feature are met, an associated electronic device may permit access to content stored with a memory of the electronic device (e.g., the electronic device may "unlock"). For example, if an input fingerprint matches a previously registered fingerprint, an associated electronic device may unlock and permit user access. The electronic device may remain unlocked for as long as an interaction with a touch-sensitive display is detected and may reinitiate the security features after the electronic device, or a portion thereof, is shut down.

These security features, therefore, relate to a one-time authentication process. Once the requirements of the security features are initially met and an electronic device is unlocked, the electronic device remains unlocked even if the given to another, lost, or stolen. Once an electronic device is unlocked, the electronic device stays unlocked until the electronic device is manually locked or times out.

SUMMARY

A method of securing an electronic device may comprise receiving, at a biometric sensor of the electronic device, a first biometric at a first time, generating a first digital representation of the first biometric, comparing the first digital representation with a previously registered biometric, unlocking the electronic device in response to the first digital representation sharing a threshold similarity with the previously registered biometric, detecting a triggering event with a second sensor of the electronic device, the second sensor different from the biometric sensor, receiving, at the electronic device and after the triggering event is detected, a second biometric at a second time, generating a second digital representation of the second biometric, comparing the second digital representation with the previously registered biometric, and determining whether the second digital representation shares the threshold similarity with the previously registered biometric.

The method may further comprise locking the electronic device and preventing access to an internal storage of the electronic device when the second digital representation does not share the threshold similarity with the previously registered biometric.

The method may further comprise capturing, from a camera of the electronic device, an image when the second digital representation does not share the threshold similarity with the previously registered biometric and transmitting a message to an account associated with the previously registered biometric, the message containing current location information of the electronic device and the image.

In the disclosed method, the sensor may be an accelerometer and the triggering event may occur when an acceleration of the electronic device surpasses a gravitational acceleration. A second digital representation of the second biometric may have a lower resolution than the first digital representation of the first biometric.

The sensor may be a camera or a light sensor and the triggering event may occur when light detected by the camera or light sensor falls below a threshold value.

The method may further comprise keeping the electronic device unlocked when the second digital representation shares the threshold similarity with the previously registered biometric, initiating a timer at the second time and continuing for a predetermined time period, and initiating an additional security request after the predetermined time period has passed.

The first biometric and the second biometric may be at least one of a vocal pattern, a fingerprint, a palm print, a facial geometry, a retina pattern, a signature, or a vein pattern.

A method for providing a continuous biometric authentication may comprise registering a first digital representation of a biometric of a user in a memory of a mobile device, establishing the first digital representation as a password for the mobile device, receiving the biometric at a biometric sensor of the mobile device, generating a second digital representation of the biometric, comparing the first digital representation of the biometric with the second digital representation of the biometric, permitting access to the memory when the first digital representation and the second digital representation of the biometric share a threshold similarity, detecting an acceleration of the mobile device, and requesting the biometric when the detected acceleration surpasses a threshold acceleration.

The biometric may be a first biometric. The method may further comprise, after the first biometric is requested, receiving a second biometric at the biometric sensor, the second biometric different than the first biometric, generating a third digital representation of the second biometric, comparing the first digital representation of the first biometric with the third digital representation of the second biometric, and blocking access to the memory when the first digital representation and the third digital representation do not share the threshold similarity.

The method may further comprise, when the second biometric is received, detecting a location of the mobile device and transmitting a message to an account associated with the user, the message containing the location of the mobile device.

The method may further comprise, after the biometric is requested, receiving the biometric at the biometric sensor, generating a third digital representation of the biometric, comparing the first digital representation of the biometric with the third digital representation of the biometric, and continuing to permit access to the memory when the first digital representation and the third digital representation of the biometric share the threshold similarity.

The third digital representation may have a lower resolution than the second digital representation. The biometric sensor may be at least one of a fingerprint sensor, a palm print sensor, a camera, an image sensor, a microphone, a LIDAR detector, or a touch sensitive display and the biometric may be at least one of a fingerprint, a palm print, a retina pattern, a facial geometry, a vocal pattern, a vein pattern, or a signature.

An electronic device may comprise a non-transitory storage medium that stores instructions, a biometric sensor configured to receive image information from a user, a device sensor configured to detect a triggering event with respect to the electronic device, and a processor the executes the instructions to receive an acceleration value of the electronic device from the device sensor, determine the acceleration of the electronic device is above a gravitational acceleration, in response to the determination that the acceleration is above the gravitational acceleration, direct the biometric sensor to initiate a facial scan of the user and generate a biometric image containing a facial geometry of the user, and compare the biometric image with a previously registered biometric image.

The processor may be further configured to restrict access to the electronic device when the biometric image does not match with the previously registered biometric image. The processor may be further configured to store a location of the electronic device.

The processor may be further configured to transmit the location of the electronic device to an external server when the biometric image does not match with the previously registered biometric image.

The processor may be further configured to generate a timer set to a predetermined time period and direct the biometric sensor to initiate an additional facial scan of the user after the predetermined time period has passed.

The processor may be further configured to permit access to the electronic device when the biometric image matches with the previously registered biometric image.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims. Identical reference numerals have been used, where possible, to designate identical features that are common to the figures.

Figure 1:
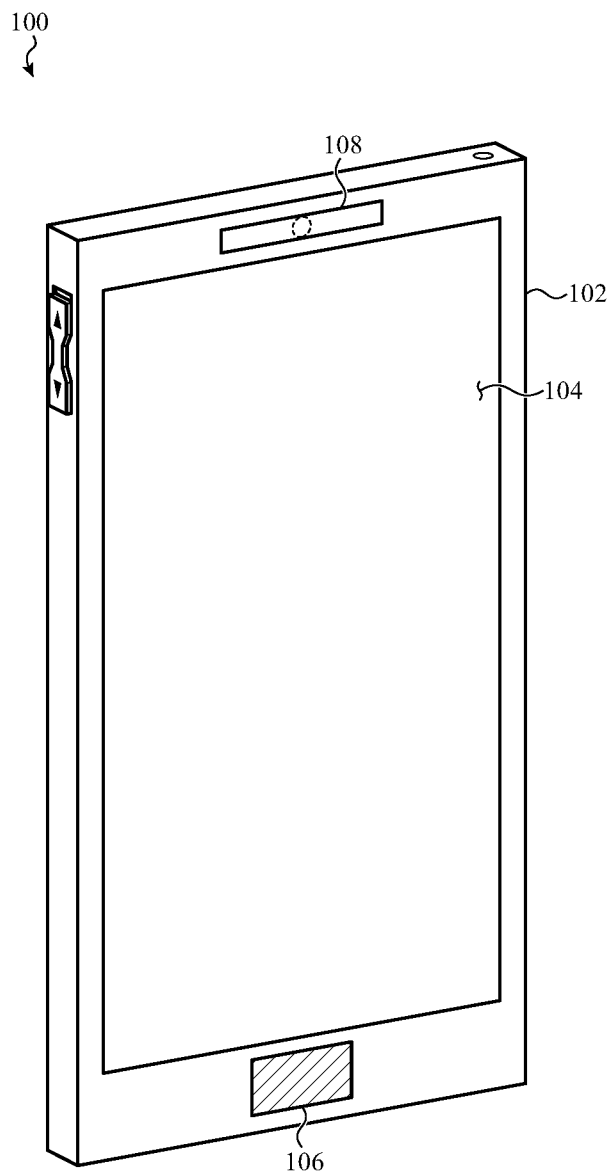
FIG. 1 illustrates an isometric view of an example electronic device that may be used to perform systems, methods, and processes for securing electronic devices, as described herein.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein, may not necessarily be presented or illustrated to scale, and are not intended to indicate any preference or requirement for an illustrated embodiment to the exclusion of embodiments described with reference thereto.

DETAILED DESCRIPTION

The following disclosure relates to systems, methods, and processes for continuously and/or periodically securing an electronic device so as to restrict access to a memory of the electronic device until a user may be identified and authorized through a registered biometric. In particular, embodiments described herein are directed to electronic devices that include security features that ensure that a person interacting with an electronic device is a registered user. Example security features include biometric authentication (e.g., performing a biometric analysis on a user's captured biometric data); password entry/management; securing a phone in response to external trigger events; and the like. Any type of biometric data may be captured and any associated hardware may be provided including a fingerprint/palm-print sensor for detecting fingerprints/palm-prints; a retina scanner and/or a camera for detecting eye/retina patterns; a signature; a facial scanning system for detecting a user's facial geometry; a microphone for detecting a user's voice; a sensor for detecting vein patterns; and the like. As used herein, both a facial recognition system and a facial scanning system may be used to detect facial geometry of a user.

In the various embodiments discussed herein, a biometric may be used as a password for an electronic device. In a non-limiting example, a fingerprint of a user may be put into contact with a fingerprint sensor. The fingerprint sensor may capture an image or other representation of the fingerprint and may transmit the image or other representation to an internal memory. Thereafter, an image of any input fingerprint may be compared with the stored fingerprint image and the electronic device may transition from a locked state to an unlocked state if the two images share sufficient similarity. In this way, the user's biometric may act as a password to unlock the electronic device.

As discussed herein, a user may unlock (e.g., access an internal memory of) an electronic device by meeting the requirements of a security request (e.g., entering a registered password or inputting biometric information that sufficiently matches with previously registered biometric data). After the electronic device is unlocked, the user may interact with the electronic device by, for example, interacting with an input/output device such as a touch-sensitive display, a keyboard, and/or a mouse; viewing a displayed graphical output; listening to an audio output; and the like. In some embodiments, an electronic device may periodically initiate a security request even after the electronic device has been initially unlocked. If the requirements of the security request are met, the electronic device may be kept in an unlocked state. If the requirements of the security request are not met (e.g., a registered password or biometric input is not received within a predetermined time period), the electronic device may transition to a locked state even if the electronic device is in use.

In some embodiments, a triggering event may initiate an additional security request. A triggering event may be a change in a physical property of the electronic device, or a region around the electronic device, as detected by one or more sensors of the electronic device. Examples of triggering events include a threshold acceleration value detected by an accelerometer; a change in humidity or temperature detected by a thermometer and/or a humidity sensor; a change in light conditions detected by a camera, optical sensor, and/or ambient light sensor; a change in an orientation of the electronic device detected by a gyroscope; and the like.

As used herein, a "locked" electronic device or an electronic device in a "locked state" may refer to: a full disabling of an electronic device; a partial disabling of an electronic device; a power-down of the electronic device; a limiting of the electronic device's functionality or features; any combination thereof; and the like. In a non-limiting example, a locked electronic device may be a device that is displaying a lock screen or login screen. A lock or login screen may depict a limited number of graphical elements, such as: a key lock icon; a time; current weather; a camera icon; any combination thereof; and the like. An "unlocked" electronic device or an electronic device in an "unlocked state" may refer to an electronic device that permits access to a user after receiving a previously registered password and/or biometric input. An unlocked electronic device may permit a user's access to certain applications stored on the electronic device. In some embodiments, an unlocked electronic device may require an additional password and/or biometric input for access to certain features, such as a banking app, a settings feature, and the like.

An embodiment may generate multiple security requests, such as an "initial security request," an "additional security request," a "continuing security request," and/or a "subsequent security request." An initial security request may be a security request presented to a user of an electronic device while the electronic device is in a locked state. If the user inputs information (e.g., a biometric and/or password information) that meets the requirements of the initial security request, the electronic device may transition from the locked state to an unlocked state. An additional, continuing, and/or subsequent security request may be a security request presented to a user or provided in a background of an operating system running on an electronic device while the electronic device is in an unlocked state. As one non-limiting example, a continuing security request may require an authorized user's fingerprint to be detected every sixty seconds while an electronic device is in an unlocked state. Every time an authorized fingerprint is detected, the sixty second timer may be reset. As one non-limiting example, if thirty seconds had passed since the last time the fingerprint was detected, a detection of the fingerprint may reset the time to the full sixty seconds. The sixty second time period is provided for explanatory purposes only and any time period may be used in accordance with the disclosure.

As described herein, an initial security request may require a digital representation of a biometric with a relatively high resolution and a subsequent security request may require a digital representation of a biometric with a lower resolution. In a non-limiting example, an initial security request may initiate when a user attempts to unlock a locked electronic device and may require a digital representation of a fingerprint to have a resolution of 500 pixels per inch. Once the electronic device is unlocked, a subsequent security request may require a digital representation of the fingerprint to have a resolution of 250 pixels per inch. The resolution values are provided for explanatory purposes only and any resolution values may be used in accordance with the disclosure.

In some embodiments, the resolution of the digital representation of the biometric may be equivalent for both the initial security request and the subsequent security request, but a more thorough analysis may be used for the initial security request. For example, the initial security request may require a procedure that compares 15 or more points, in a biometric analysis, between a received digital representation of a biometric and a previously enrolled digital representation of a biometric. Each subsequent security request may require a procedure that compares 5-10 points between a received digital representation of the biometric and the previously enrolled digital representation of the biometric. The precise number of points that need to match in order for user's identity to be confirmed may be referenced as a threshold similarity. The number of points to be compared is merely explanatory and any value may be used in accordance with the disclosure. As used herein, a "digital representation" of a biometric may be an image, sound data, a string of text/data, or any other representation of biometric data.

A similarity score may be measured with respect to a previously enrolled biometric and an input biometric during a security request. The similarity score may be determined using biometric analyses and may generally relate to a degree of similarity between a previously registered digital representation and an input digital representation. If a threshold similarity is reached (e.g., a similarity score is above a certain value), the compared digital representations may be considered to be of the same biometric and a user's identity may be verified. As used herein, a registered digital representation and an input digital representation sharing a threshold similarity refers to a sufficient match between the biometric digital representations.

In this way the electronic device may have a high degree of confidence that the user requesting access is the same user as the registered user. As described above, a subsequent security request may initiate a capture of a lower resolution image of a user's fingerprint and may compare the lower resolution image with the higher resolution image obtained during the registration process. Since the user was already authorized during the initial security request, a less stringent check may be used. In this way, a subsequent security request may be run at a lower power level, as a background process, and/or without resulting in any stuttering or lagging on the electronic device.

In a non-limiting example of how the disclosed system operates, a registered user may initially unlock an electronic device by providing a biometric in response to an initial security request. After the electronic device is unlocked, a thief may steal the electronic device, may run away, and may attempt to access personal information stored on the electronic device. In some embodiments, an accelerometer may detect an acceleration value of the electronic device corresponding to the theft of the device or the thief's fleeing. As a non-limiting example, the acceleration value may above a gravitational acceleration, where gravitational acceleration is set as an acceleration threshold value. The accelerometer may transmit a signal to a processing system of the electronic device that includes acceleration data, the processing system may determine whether the acceleration data exceeds a threshold, and the processing system may direct the electronic device to initiate a subsequent security request to obtain updated biometric information by, for example, a fingerprint sensor. If an unregistered fingerprint, or no fingerprint, is obtained at the fingerprint sensor within a predetermined period of time, the electronic device may automatically lock and prevent access to an internal memory of the electronic device or to other device functions.

In some embodiments, the subsequent security request may be conveyed to the user as, for example, a pop-up graphic, a haptic signal, or as any kind of sensory information designed to alert a user. In alternative or additional embodiments, the subsequent security request may be performed in a background process of the electronic device, so that the user is unaware that biometric information is being captured. In either example, the electronic device may automatically lock as soon as an unauthorized fingerprint or biometric is detected or whenever a time period for entering the fingerprint or biometric expires.

In some embodiments, a failed response to a subsequent security request may partially lock certain aspects of the electronic device. For example, if an authorized biometric is not received within the time period, access to certain applications and/or settings may be restricted while access to a web browser may be permitted. In some embodiments, a failed response may result in an electronic device displaying a lock screen and/or fully powering down.

In an additional non-limiting example of the disclosed system, a previously authorized user (e.g., a user who previously registered biometric data in the electronic device or associated systems) may willingly pass an electronic device to an unauthorized user, who has no registered biometric data on the electronic device, in order for the second user to use the electronic device. As used herein, "unauthorized user" means a user who is not enrolled with the electronic device and no data pertaining to the user's biometrics are stored in the electronic device or systems associated with the electronic device.

In the above example, an accelerometer may detect an acceleration value associated with the passing of the electronic device and transmit the acceleration value to a processing system of the electronic device of the acceleration value. The processing device may determine that the acceleration value is below a threshold acceleration value and may not require a subsequent security request. In this way, triggering events most likely associated with a theft, change in location, or forcible transfer of possession may initiate subsequent security requests while events most likely associated with a harmless scenario, such as willingly handing an electronic device to another, may delay or prevent a subsequent security request.

Triggering events, therefore, may relate to an event that is indicative of a theft and/or a change in a location of the electronic device. In addition to acceleration values, a change in humidity; a change in electronic device orientation; a change in ambient light; a received sound; a change in temperature; a change in heartrate; any combination thereof; and the like may be a triggering event. In a non-limiting example, a thief may move the stolen electronic device to a pocket, bag, or other hidden location. In an enclosed space, humidity, temperature, ambient light, and/or ambient sound values may be different than they would be in an open space. Sensor values generally indicative of a transition of the electronic device from an open space to an enclosed space, or vice versa, may be considered a triggering event. In some embodiments, one or a number of microphones may be configured to collect ambient sound. If a volume of the ambient sound changes (e.g., the ambient sound becomes louder or quieter), a theft may have occurred as the thief may have placed the electronic device in a pocket or bag. In some embodiments, a microphone and associated processing system may be configured to detect certain words such as "Stop" or "Thief." The detections of these words may also be considered a triggering event.

In some embodiments, a triggering event may be a combination of detected events. For example, a triggering event may occur when an acceleration reaches a certain threshold and when an orientation of an electronic device (as measured by a gyroscope) is upside down.

In some embodiments, a processing system of an electronic device may lock the electronic device whenever an unauthorized biometric is detected. For example, after an initial security request is satisfied and the electronic device is unlocked, a fingerprint detector may operate at a low power state and may take lower resolution images of an input fingerprint. If an unauthorized fingerprint is detected at the fingerprint detector, at any time, the processing system may immediately lock and/or shut down the electronic device. In additional or alternative embodiments, a camera may be provided and may continuously take images of a user's face. If the camera detects a face not belonging to a registered user, a processing system of the electronic device may direct the electronic device to lock and/or shut down. Other kinds of biometrics and biometric sensors may be used, including an eye/retina scanner, a vein detection scanner, and the like.

Any type of electronic device may be used in accordance with the provided disclosure. For example, an electronic device may be: a mobile phone; a smart phone; a desktop computer; a laptop computer; a tablet; an electronic watch; a GPS system; and the like. Further, any kind of sensor may be used to detect a triggering event, in accordance with the provided disclosure. For example, an accelerometer may detect an acceleration; a proximity sensor may detect the proximity of an object to an electronic device; a barometer and/or a thermometer may detect weather and/or environmental conditions; an ambient light sensor may detect ambient light; a camera may detect image information; a gyroscope may detect an orientation of an electronic device; a global positioning system (GPS) sensor and/or magnetometer may detect location data; Wi-Fi signals may be used to detect location data; and so on. As discussed above, the described sensors may be configured to detect a change in location and/or state of an electronic device. For example, a gyroscope may be used to detect when an electronic device has been placed in bag, which may correspond to a theft. In some embodiments, a message containing location data and/or sensor data of the electronic device may be sent to an account associated with an authorized user.

These and other embodiments are discussed with reference to FIGS. 1-6. However, those skilled in the art will readily appreciate that the detailed description given herein with respect to these figures is for explanatory purposes only and should not be construed as limiting.

FIG. 1 illustrates an example electronic device 100 that may be used to perform security processes, in accordance with some described embodiments. The electronic device 100 may include a housing 102, a display 104, a biometric sensor 106, and an optical sensor 108. The electronic device 100 is depicted as a mobile phone and/or smart phone in FIG. 1. Other embodiments are not limited to this type of electronic device and may include laptops, handheld gaming devices, and the like.

As depicted in FIG. 1, the electronic device 100 includes a housing 102 that forms an outer surface or partial outer surface for the internal components of the electronic device 100. The housing 102 at least partially surrounds a display 104, a biometric sensor 106, an optical sensor 108, and/or any number of input/output devices such as buttons, levers, sliders, and the like. The housing 102 may be formed of one or more components operably connected together, such as a front piece and a back piece. Alternatively, the housing 102 may be formed of a single piece operably connected to the display 104. The housing 102 may be formed of any suitable material, including, but not limited to, plastics, metals, fabrics, elastomers, glass, minerals, ceramics, any combination thereof, and the like. In the illustrated embodiment, the electronic device 100 is formed into a substantially rectangular shape, although other forms of the housing 102 may be used.

In some embodiments, the display 104 may be a touch-sensitive display configured to receive touch and/or force inputs. The display 104 may be implemented with any suitable display such as a multi-touch sensing touchscreen device that uses a liquid crystal display (LCD), light emitting diode (LED), organic light emitting display (OLED), organic electro-luminescence (OEL), any combination thereof, and the like. The display 104 may be located anywhere on the electronic device 100 and may comprise one or multiple displays.

In some embodiments, the display 104 may be configured to receive a biometric input from a user. For example, a touch-sensitive display may detect a fingerprint, body heat, and/or a force of an input. In some embodiments, the display 104 may be configured to capture a high- or low-resolution image of a fingerprint as a user of the device touches and interacts with the display 104. In this way, the display 104 may act as an additional biometric sensor (e.g., a biometric sensor such as, or in addition to, the biometric sensor 106).

The biometric sensor 106 may be a sensor configured to receive a biometric input from a user and may convert the received biometric input into a digital representation for, for example, authentication, identification, and/or other operations of the electronic device 100. In some embodiments, the biometric sensor 106 may be a fingerprint sensor configured to capture an image (or other representative data) of a finger that is in contact with the biometric sensor 106. The biometric sensor 106 may be used in conjunction with a processing unit to verify that a user is an authorized and/or registered user. For example, the biometric sensor 106 may capture a digital representation of a biometric and may transmit the digital representation to the processing unit. Once the processing unit receives the digital representation, the processing unit may compare the digital representation of the biometric with biometric data such as stored images or other representative data that had previously been input during a biometric registration process.

In some embodiments, the biometric sensor 106 may be another kind of biometric sensor other than a fingerprint sensor, such as, for example: a microphone; a camera and/or a facial recognition sensor suite; a retina/eye scanner; any combination thereof; and the like. The biometric sensor 106 may be positioned below the display 104 (as depicted in FIG. 1), may be positioned on a side of the housing 102, may be positioned on a back of the housing 102, or may be otherwise positioned anywhere on or within the electronic device 100. In some embodiments, multiple biometric sensors may be positioned on or within the electronic device 100 and may be configured to detect different biometric inputs. As discussed herein, in embodiments where multiple biometric sensors are provided, one biometric sensor may be used to capture an authorization biometric corresponding to an initial security request and another biometric sensor may be used to capture a continuing biometric corresponding to a subsequent security request. For example, the biometric sensor 106 may be used to capture a high-resolution image of a fingerprint at an initial security request and the display 104 may be used to capture a low-resolution image of the fingerprint during a subsequent security request.

The electronic device 100 may further include an optical sensor 108. In some embodiments, the optical sensor 108 may include a camera configured to take pictures of, for example, a user's face. In some embodiments, as depicted in FIG. 1, the optical sensor 108 may be a front-facing optical sensor (e.g., an optical sensor pointed in the same direction as the display 104). In alternate or additional embodiments, the optical sensor 108 may be a rear-facing optical sensor positioned on a back portion of the housing 102. The optical sensor 108 may additionally be provided with a light emitter to illuminate a scene to facilitate capturing images with the optical sensor 108. In certain embodiments, the optical sensor 108 may be the biometric sensor 106 (or one of multiple biometric sensors).

The optical sensor 108 may be configured as a facial recognition system configured to detect a facial geometry of a user. In some embodiments, the optical sensor 108 may include a light emitter and a camera to capture three-dimensional depth maps. In some embodiments, the optical sensor 108 may be a camera configured to capture two-dimensional images. The optical sensor 108 may be associated with a processing system and a memory in order to perform identification and authentication processes. For example, during a registration phase, the optical sensor 108 may capture an image or other representative data of a user's face. The image or other representative data may include multiple types of data (e.g., multiple images) at different angles and/or time periods. The image(s) or other representative data may be stored in a memory of the electronic device 100 and may operate as a biometric password. Thereafter, whenever the registered user's face is detected by the optical sensor 108, the captured image or representative data may be compared with the previously registered image or representative data. If the captured data shares a threshold similarity with the stored data, a user's identity may be confirmed and a processing system may direct the electronic device 100 to transition from a locked state to an unlocked state. If the captured data does not share a threshold similarity, the electronic device 100 may transition to, or remain in, the locked state. The optical sensor 108 may additionally include an ambient light sensor to detect an amount of light surrounding the electronic device 100.

Figure 2:
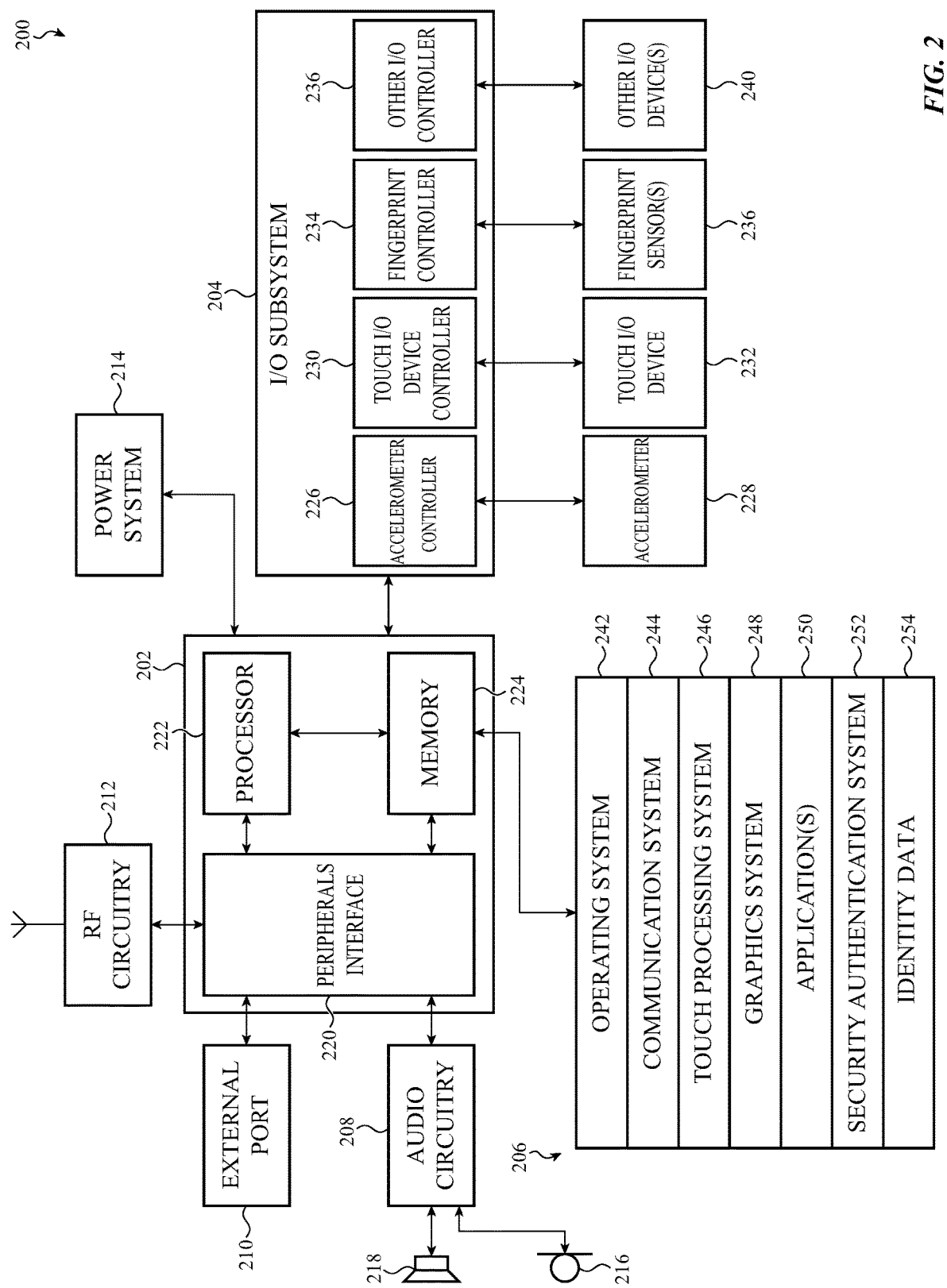
FIG. 2 depicts an example block diagram of components of an electronic device that may be used to perform systems, methods, and processes for securing electronic devices, as described herein.

FIG. 2 depicts an example block diagram of components of an electronic device 200. The electronic device 200 may correspond to the electronic device 100, depicted in FIG. 1. The electronic device 200 may include electronic components 202, a peripherals interface 220, a processing system 222 (e.g., a processor), a memory 224, radio frequency (RF) circuitry 212, a power system 214, an external port 210, audio circuitry 208, and an input/output (I/O) subsystem 204. The electronic device 200 may be any electronic device and may include other components not explicitly shown in FIG. 2.

The electronic components 202 may be components electronically coupled to a main circuit board (e.g., a motherboard) or may otherwise be communicatively coupled. The processing system 222 may control some or all of the operations of the electronic device 200. The processing system 222 may communicate, either directly or indirectly, with some or all of the components of the electronic device 200. For example, a system bus or other communication mechanism may provide communication between the processing system 222, the memory 224, the RF circuitry 212, the power system 214, the external port 210, and the input/output (I/O) subsystem 204.

The processing system 222 may be implemented as any device or system capable of processing, receiving, or transmitting data or instructions. For example, the processing system 222 may be a microprocessor, a central processing unit (CPU), an application-specific integrated circuit (ASIC), a digital signal processor (DSP), combinations of such devices, and the like. As described herein, the phrase "processing system" may encompass a single processor or processing unit, multiple processors, multiple processing units, or other suitably configured computing element or elements.

The peripherals interface 220 may couple the input and output peripherals of the electronic device 200 to the processing system 222 and the memory 224 via a controller. In a non-limiting example, the peripherals interface 220 may couple the accelerometer 228 and the fingerprint sensor(s) 236 to the processing system 222 and the memory 224.

Components of the electronic device 200 may be controlled by the processing system 222 including multiple processing units. For example, select components of the electronic device 200 (e.g., the fingerprint sensor(s) 236) may be controlled by a first processing unit and other components (e.g., the accelerometer 228) may be controlled by a second processing unit, where the first and second processing units may or may not be in communication with each other. In some cases, the processing system 222 may perform an identification or authentication of a registered user and may direct the electronic device 200 to transition to a locked mode in response to signals from the I/O subsystem 204.

The memory 224 may store electronic data that may be used by the electronic device 200. For example, the memory 224 may store electrical data or content such as, for example: software 206; an operating system 242; a number of applications 250 that operate on the operating system 242; audio and video files; documents; device settings and user preferences; and the like. The memory 224 may additionally store identity data 254 corresponding to stored images or biometric data corresponding to a registered user of the electronic device 200. The memory 224 may be configured as any type of memory. By way of example only, the memory 224 may be implemented as random access memory, read-only memory, Flash memory, removable memory, other types of storage elements, or combinations of such devices.

The memory 224 may additionally be configured to store data related to a communication system 244, a touch processing system 246, a graphics system 248, and a security authentication system 252. The communication system 244 may facilitate communication with other electronic devices over one or more external ports (e.g., the external port 210) or via RF circuitry 212. The communication system 244 may include various software components for handling data received from the external port 210 and/or the RF circuitry 212.

The touch processing system 246 may include various software components for performing various tasks associated with the touch I/O device 232 including but not limited to receiving and processing touch input received from the touch I/O device 232 via the touch I/O device controller 230. The graphics system 248 may include various known software components for rendering, animating, and displaying graphical objects on a display. The graphics system 248 may work in conjunction with the touch processing system 246 to render, display, and animate objects on a touch sensing display.

The security authentication system 252 may utilize the identity data 254 to authenticate a user's identity. For example, the security authentication system 252 may compare input biometrics with previously registered biometrics in order to confirm whether a user attempting to access the electronic device 200 is an intended user. The security authentication system 252 may include any software or hardware used for biometric authentication.

The RF circuitry 212 may allow the electronic device 200 to communicate wirelessly with various host devices. The RF circuitry 212 may include RF transceiver components, such as an antenna and supporting circuitry, to enable data communication over a wireless medium (e.g., using wireless standards), BLUETOOTH, or other protocols for wireless data communication. The RF circuitry 212 may be implemented using a combination of hardware (e.g., driver circuits, antennas, modulators/demodulators, encoders/decoders, and the like) and software components. In some examples, the RF circuitry 212 may provide near-field communication (NFC) capability. In some examples, NFC may support wireless data exchange between electronic devices over a very short range (e.g., 20 cm or less). Multiple different wireless communication protocols and associated hardware may be incorporated into the RF circuitry 212.

The power system 214 may provide power and power management capabilities for the electronic device 200. For example, the power system 214 may include a battery (e.g., one or a number of rechargeable batteries) and associated circuitry to distribute power from the battery to other components of the electronic device 200 that require electrical power. In some examples, the power system 214 may also include circuitry operable to charge the battery when, for example, the external port 210 is connected to a power source via, for example, an electrical outlet. In some examples, the power system 214 may include a wireless charger, such as an inductive charger, to charge the battery without relying on the external port 210. In some embodiments, the power system 214 may also include other power sources (e.g., a solar cell) in addition to, or instead of, the battery.

The external port 210 may be any port, or number of ports, configured to connect the electronic device 200 to an external device or system. For example, the external port 210 may include one or a number of ports designed to facilitate charging, provide a wired audio connection (e.g., microphones and/or speakers), connect the electronic device 200 to an external electronic device (e.g., connecting a mobile phone to a laptop computer via a wired communication path), and the like.

Audio circuitry 208 may be coupled to a speaker 218 and a microphone 216 and may include circuitry for processing voice signals to enable a user to communicate with other users. In some examples, the audio circuitry 208 may include a headphone jack. In some embodiments, the microphone 216 may operate as a sensor and may be configured to capture voice and/or biometric information.

A speaker 218 may be provided to generate audio waves to produce a sound (e.g., speech or music) to a user of the electronic device 200. In some embodiments, the speaker 218 may be provided in a small form to fit within the electronic device 200. In some embodiments, the speaker 218 may be configured to generate a tone whenever a biometric input is requested for continuing authentication.

A microphone 216 may be provided to receive audio information from a region surrounding the electronic device 200. The microphone 216 may include any device that converts sound waves into electronic signals. In some embodiments, the microphone 216 may be configured to receive spoken word inputs from a user and may be used with the processing system 202 to perform a voice recognition analysis (e.g., identifying a user based on the sound of the user's voice).

The I/O subsystem 204 may include various electronic, mechanical, electromechanical, optical, and/or other apparatuses that may provide information to a user of the electronic device 200 and/or may receive information related to external conditions around the electronic device 200. As depicted in FIG. 2, the I/O subsystem 204 may include various controllers to control operations of various sensors and other I/O devices.

The I/O subsystem 204 may include an accelerometer controller 226 to control operations of an accelerometer 228, a touch I/O device controller 230 to control operations of a touch I/O device 232, a fingerprint controller 234 to control operations of a fingerprint sensor 236, and other I/O controllers 236 to control operations of other I/O devices 240.

As examples of other I/O controllers 236 and/or devices 240, the electronic device 200 may include: a camera; a haptic output device; one or more displays; optical sensors; a GPS receiver; biometric sensors; environmental sensors; a gyroscope; a magnetometer; ultrasound sensors; LIDAR detectors; smoke/particle detectors; Geiger detectors; a proximity sensor; and the like. A camera may include, for example, a compact digital camera that includes an image sensor such as a CMOS sensor and optical components (e.g., a lens) arranged to focus an image onto the image sensor. The camera may allow a user to take pictures on the electronic device 200. In some embodiments, the camera may be positioned on a front housing of the electronic device 200 or may be positioned on a rear housing. The camera may be one camera or may be any number of cameras. In some embodiments, the camera may be configured to capture an image of a user and compare the image of the user with the stored identity date 254 to confirm an identity of the user and unlock the electronic device 200 if the user is authenticated.

A haptic output device may be a device that converts electrical signals into vibrations. In some embodiments, the vibrations may be powerful enough to be detected by a user of the electronic device 200. The haptic output device may provide vibrations in response to a user input. For example, the haptic output device may vibrate with a user interacts with a display. In some embodiments, the haptic output device may vibrate during an initial or subsequent security request. For example, a user may be interacting with the electronic device 200 and a triggering event may occur. In response to the triggering event, the haptic output device may vibrate to alert the user that a biometric input (e.g., a fingerprint) is necessary to keep the electronic device 200 unlocked. As a non-limiting example, a triggering event may be an acceleration value, as captured by an accelerometer 228, of an electronic device that surpasses a threshold acceleration value. An example of a threshold acceleration value may be the value of gravitational acceleration (e.g., when an accelerometer of the electronic device detects the electronic device having an acceleration above gravitational acceleration).

A touch I/O device 232 may be provided as, for example, a capacitive sensor array and may detect touch locations on a surface of the electronic device 200. In some embodiments, the touch I/O device 232 may be provided as an overlay over a display and may cooperate with the display to act as a touchscreen. In some embodiments, the touch I/O device 232 may be configured to receive biometric inputs such as, for example, a fingerprint and/or a finger size. The touch I/O device 232 may capture biometric inputs at a lower resolution than the fingerprint sensor 236.

The accelerometer 228 may sense an acceleration value of the electronic device along one or more axes. In some embodiments, the accelerometer 228 may include piezoelectric or other components to produce a signal. As discussed herein, the accelerometer 228 may detect when the electronic device 200 is grabbed or dropped. The processing system 222 may establish a threshold value corresponding to a trigger event that initiates a subsequent security request when the accelerometer 228 detects an acceleration value above the threshold value.

A GPS receiver may determine location of the electronic device 200 based on signals received from GPS satellites. As discussed herein, in some embodiments the GPS receiver may, when a locking operation is initiated in response to a failed biometric authentication, send location data to the processing system 222 and the processing system 222 may transmit the location data to an account owned by a registered user. In some embodiments, the processing system 222 may determine, from location data gathered by the GPS receiver, that the electronic device 200 has spent a long amount of time in an unusual location. In response to this determination, the processing system 222 may transmit the location data to an account owned by the registered user.

Biometric sensors may be provided in combination with another input/output device or may be provided as a standalone device. In some embodiments, biometric sensors may include a fingerprint sensor 236 designed to capture a fingerprint or palm print pattern from a user's finger or palm. Additional biometric sensors may include one or multiple biometric sensors configured to capture the same type of biometric (e.g., a fingerprint) or different types of biometrics (e.g., a fingerprint and a facial scan).

Environmental sensors may be provided and may include any sensor configured to detect an environmental and/or weather condition. For example, environmental sensors may include a thermometer, a barometric pressure sensor, a humidity sensor, and the like. Environmental sensors may be configured to detect a triggering event, such as a change in temperature and/or pressure indicative of the electronic device being placed in a pocket or in another environment. A barometric pressure sensor may additionally be able to detect an elevation of the electronic device 200.

A gyroscope may be configured to detect an orientation and/or rotation movement of the electronic device using, for example, a micro-electro-mechanical system and related circuitry. The gyroscope may be configured to act in combination with other sensors to detect a triggering event (e.g., a triggering event may be detected when the electronic device is upside down and has a certain acceleration as detected by the accelerometer 228). In this way, a triggering event may be a combination of detected information from a number of sensors.

A magnetometer may detect an ambient magnetic field (e.g., Earth's magnetic field) and may be able to determine a compass direction. A proximity sensor may be able to detect a proximity of the user to the electronic device 200 (e.g., by sound or light waves) and may be used to initiate a subsequent security request if, for example, no user is detect in the proximity of the electronic device 200.

Figure 3A:
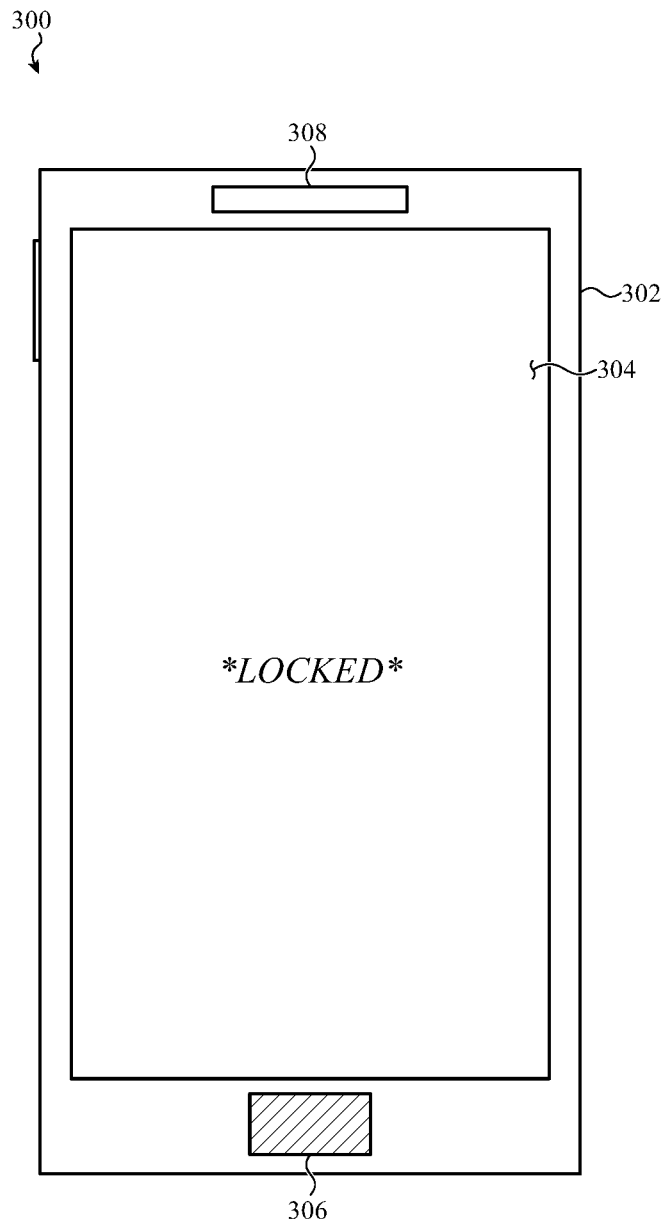
FIG. 3A illustrates an example electronic device in a locked state, as described herein.
Figure 3B:
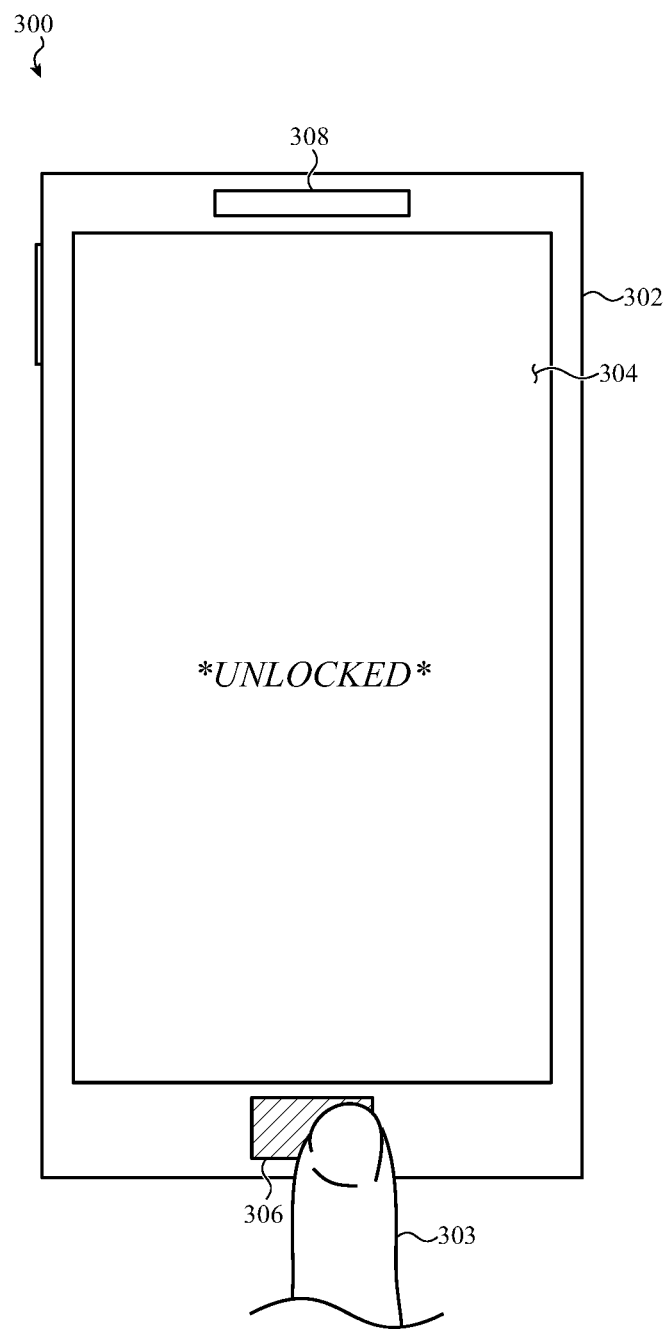
FIG. 3B illustrates an unlocking operation of an example electronic device, as described herein.
Figure 3C:
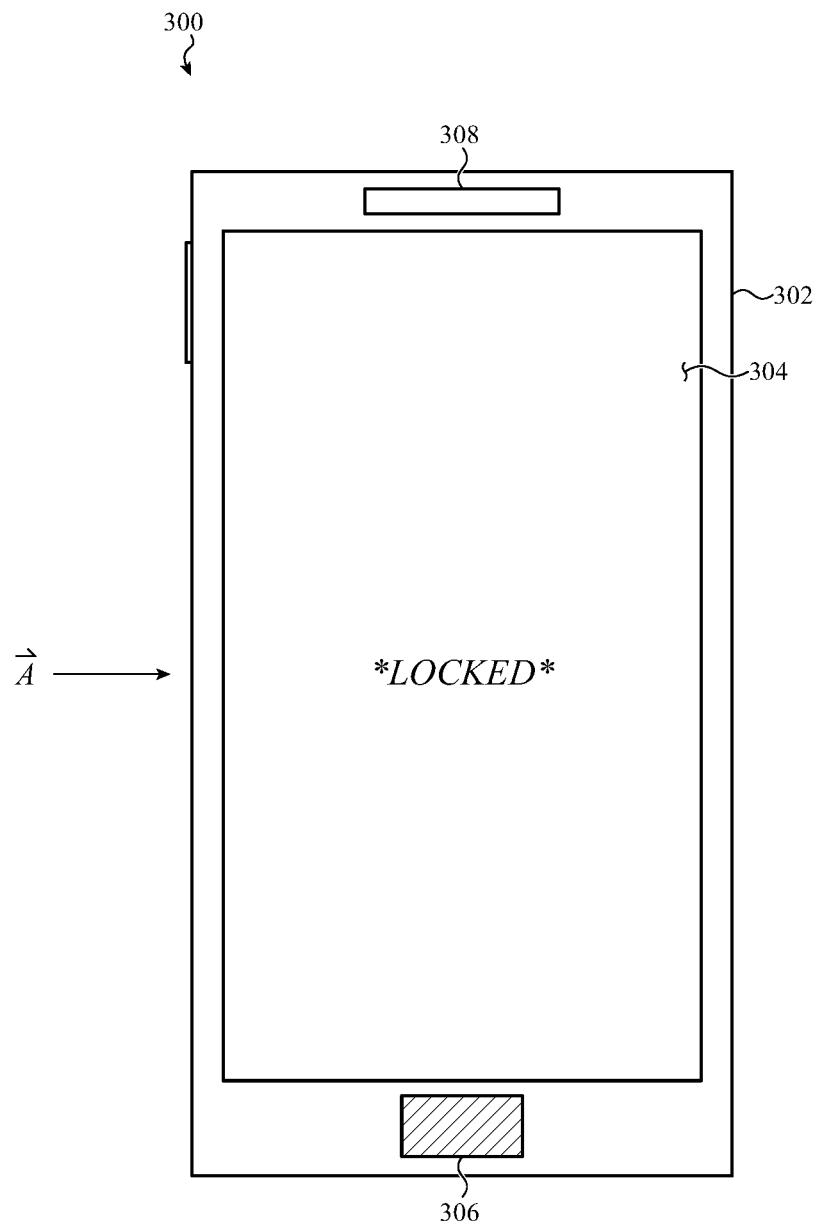
FIG. 3C illustrates an example triggering event that initiates a locking operation of an example electronic device, as described herein.

FIGS. 3A-3C illustrate different states of an electronic device 300 with respect to a biometric input and a detected triggering event. FIG. 3A illustrates the electronic device 300 while in a locked state. The electronic device 300 includes a housing 302, a display 304, and a biometric sensor 306. As described with respect to FIGS. 3A-3C, the biometric sensor 306 may be a fingerprint sensor, though any biometric sensor may be used. Though the word *Locked* appears on the display 304 in FIG. 3A, any manner of graphical output may be used while the electronic device 300 is in a locked state. The state illustrated in FIG. 3A may be before a registered biometric input is received at the biometric sensor 306.

FIG. 3B illustrates the electronic device 300 when a biometric input (e.g., a fingerprint on a finger 303 of a user) comes into contact with the biometric sensor 306. In the embodiment illustrated in FIG. 3B, the fingerprint on the user's finger 303 matches with preregistered fingerprint data and confirms an identity of the user. Once the identity of the user is confirmed and authenticated, the electronic device 300 may transition from a locked state to an unlocked state. After the electronic device 300 transitions to the unlocked state, the graphical output may be any graphical output that permits a user to interact with the electronic device (e.g., an image, a browser, or a menu). As depicted in FIG. 3B, the word *Unlocked* appears on the display 304, though any graphical output may be used.

FIG. 3C illustrates the electronic device 300 when a triggering event $\vec{A}$ is applied to the electronic device 300. In FIG. 3C, the triggering event $\vec{A}$ is depicted as an acceleration, though other triggering events (e.g., a changing light condition or a changing orientation of the electronic device 300) may be detected in additional or alternative embodiments. The triggering event $\vec{A}$ may correspond to a triggering acceleration that meets or surpasses a threshold embodiment. For example, in some embodiments a triggering acceleration threshold value may be at or above 2.5 times gravitational acceleration (e.g., 2.5×g), or approximately 24.5 m/s$^2$. In the event the threshold acceleration is set to this value, whenever an accelerometer of the electronic device 300 detects an acceleration at or above 24.5 m/s$^2$, the electronic device 300 may transition from the unlocked state to the locked state. Similarly, whenever the accelerometer detects an acceleration below 24.5 m/s$^2$, the electronic device 300 may remain in the unlocked state. In some embodiments, the triggering acceleration threshold may be equivalent to a gravitational acceleration (e.g., 9.8 m/s$^2$). The above values are presented merely for explanatory purposes and other acceleration values may be used.

In the embodiment illustrated in FIG. 3C, the electronic device 300 transitions from an unlocked state to a locked state when a triggering event $\vec{A}$ occurs. In alternate or additional embodiments, when a triggering event $\vec{A}$ is detected, the electronic device 300 may request a subsequent security request (e.g., the electronic device 300 may request a biometric). If an authorized biometric is received by the electronic device 300 within a predetermined time period (e.g., sixty seconds), then the electronic device 300 may remain unlocked until a future triggering event is detected. If an authorized biometric is not received by the electronic device 300 within the predetermined time period, then the electronic device 300 may transition from the unlocked state to the locked state. The predetermined time period is not limited to any particular time period and may be, for example, 5 seconds, 15 seconds, 30 seconds, and so on.

Figure 4:
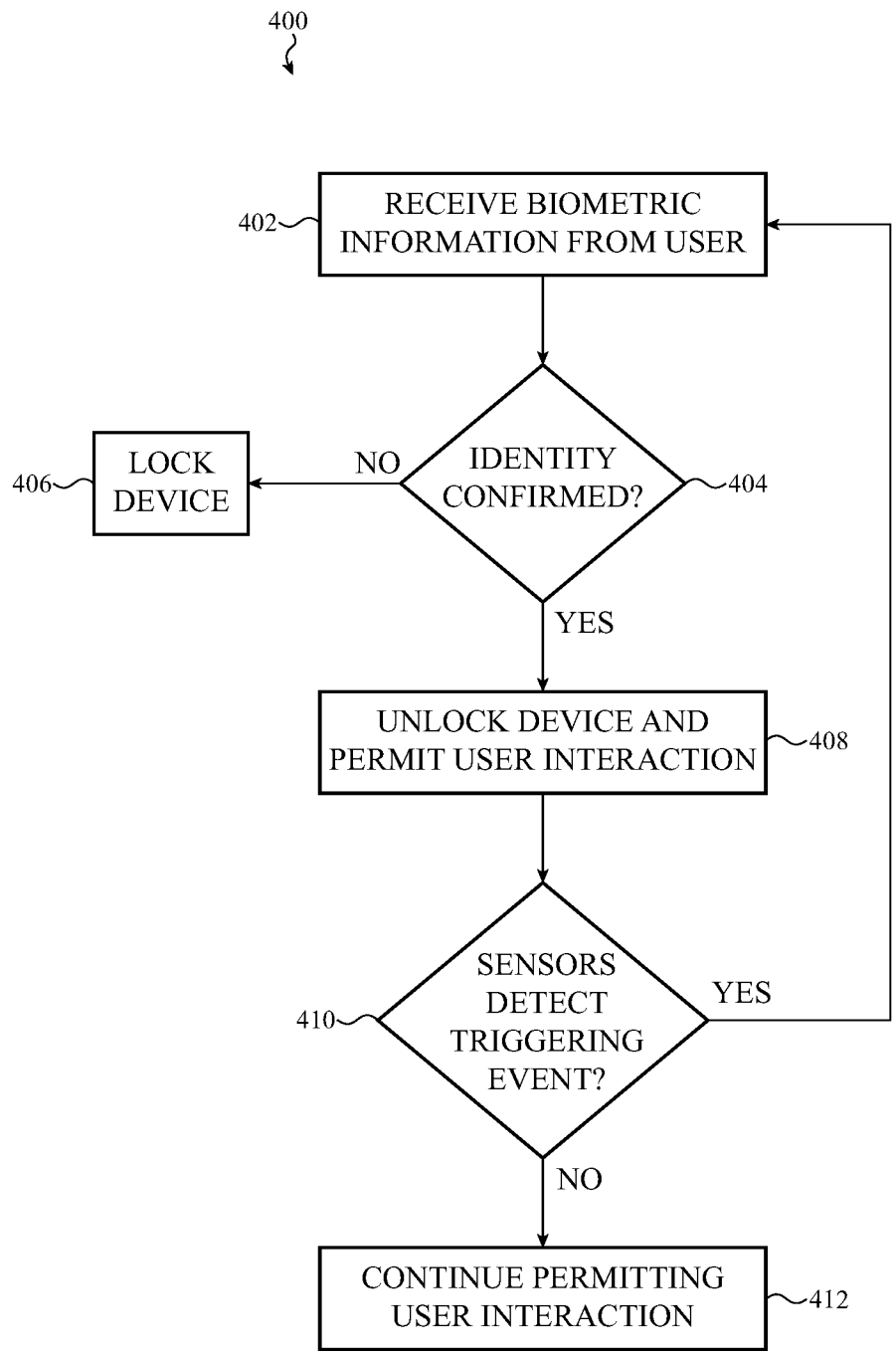
FIG. 4 depicts a flowchart of an example process for performing periodic biometric authentication in response to a triggering event, as described herein.
Figure 5:
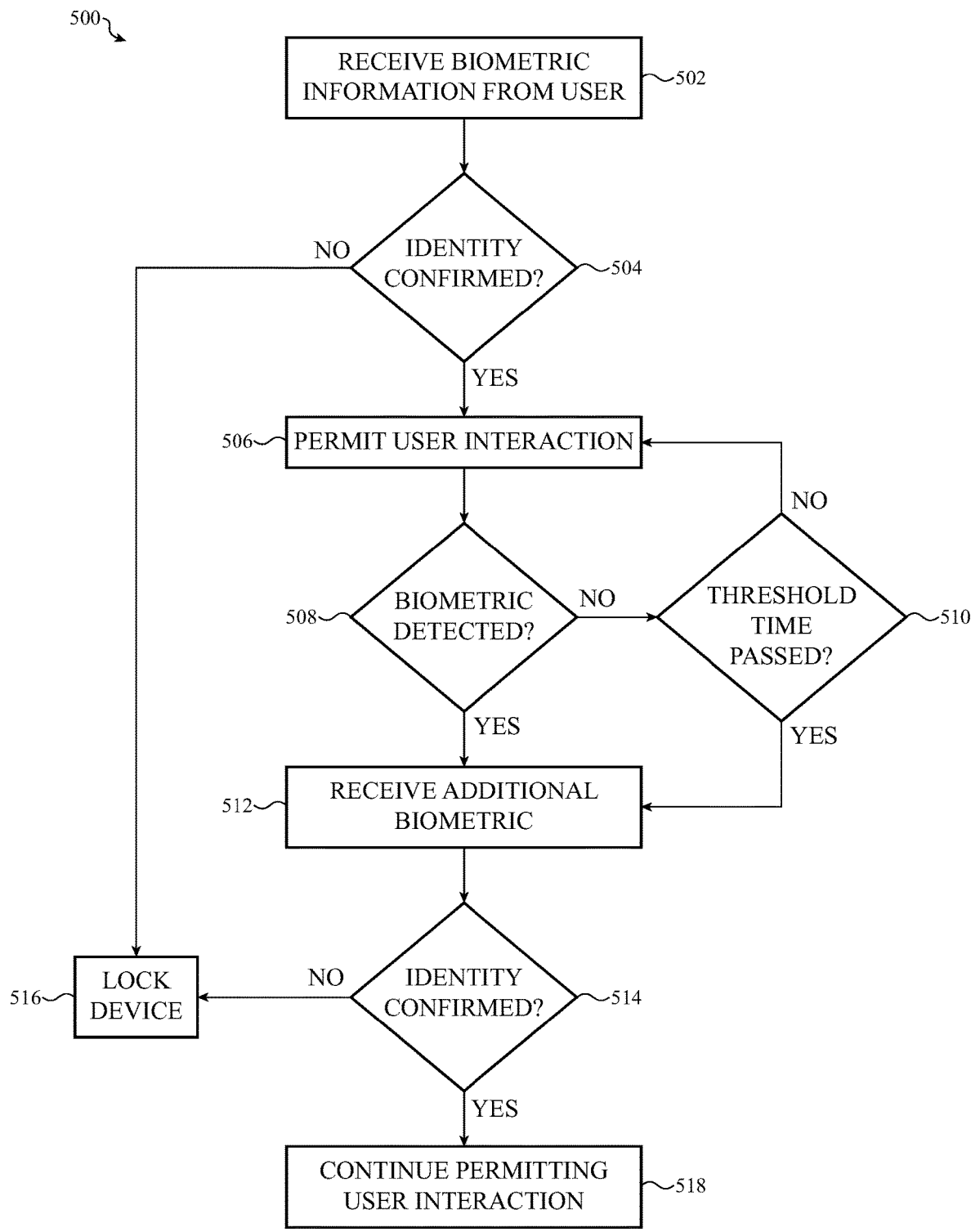
FIG. 5 depicts a flowchart of an example process for detecting and authenticating a user of an electronic device in response to receiving an additional biometric or after a threshold amount of time has passed, as described herein.
Figure 6:
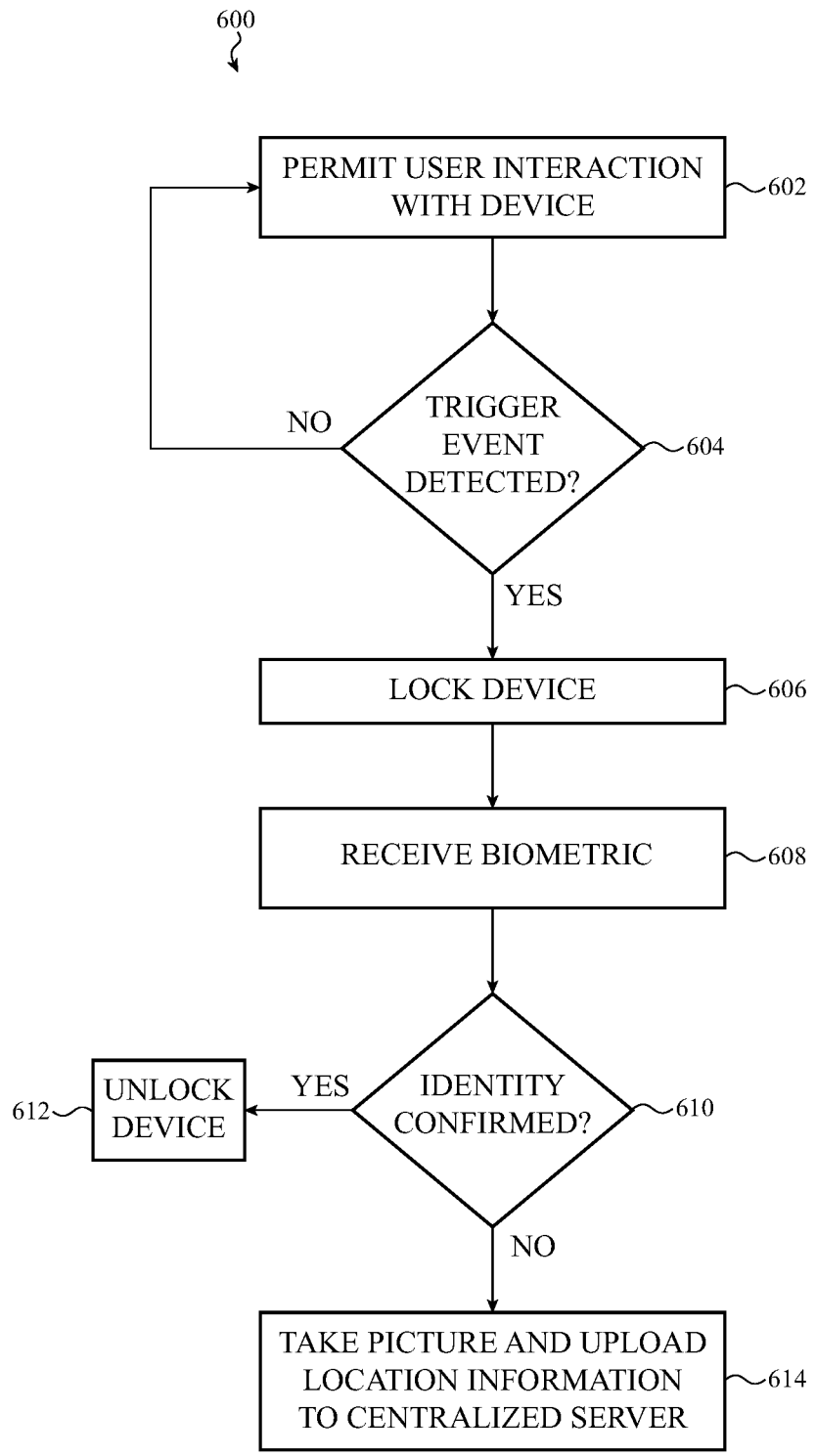
FIG. 6 depicts a flowchart of an example process for providing location information and sensor information of an electronic device during a security procedure, as described herein.

Processes of the disclosure will now be discussed with reference to FIGS. 4-6. Though the processes in FIGS. 4-6 are discussed with respect to certain components of an electronic device, these components are merely explanatory. Any hardware and/or software may be used in conjunction with the disclosed processes, as discussed herein.

FIG. 4 depicts a flowchart of an example process 400 for performing a periodic biometric authentication in response to a triggering event. The process 400 may begin at operation 402, where biometric information may be received from a user. In some embodiments, the biometric information may be received by a fingerprint and/or biometric sensor. In some embodiments, the electronic device is in a locked state at operation 402.

At operation 402, the user may input a fingerprint to a fingerprint sensor. The user may be directed to enter the fingerprint by the electronic device (e.g., the electronic device may display a graphic, may produce a tone, or may flash a light to alert the user to enter a biometric input) or the user may enter the fingerprint whenever the electronic device is in a locked state to unlock the electronic device. In alternate or additional embodiments, any type of biometric may be received at operation 402. In some embodiments, an electronic device may initiate a facial scan to detect facial information from a user. In some embodiments, a voice of a user may be measured by vocal recognition mechanisms.

At operation 404, the electronic device may confirm and/or authenticate an identity of the user in response to the received biometric. As discussed herein, the input biometric may be compared with a biometric previously input during a registration process by an authorized user. For example, during a registration process, the electronic device may initiate a biometric security process to establish a user's biometric data as a password to the electronic device. Once the user inputs a biometric (e.g., a fingerprint) to a biometric sensor (e.g., a fingerprint sensor), the electronic device may generate a digital representation of the input biometric and may store the digital representation of the input biometric as an image or any other representation of biometric data. Thereafter, any biometric received at the biometric sensor may be used to generate a respective digital representation of the biometric and may be compared with the digital representation of the originally registered biometric. If the two digital representations of the biometric match, or otherwise share a sufficient similarity, the user may be considered authorized and an electronic device may transition from a locked state to an unlocked state. In some embodiments, a processing unit of an electronic device may compare the previously registered and input biometric data.

At operation 406, the user's identity may not be confirmed and/or the input biometric may not correspond to the registered biometric as determined by a processing unit. Here, systems of the electronic device may determine that the input biometric does not match or share a sufficient similarity with the previously registered biometric. In response to a failed identification confirmation, the electronic device may transition to a locked state or may remain in the locked state.

At operation 408, the user's identity may be confirmed and/or the input biometric may be determined to correspond to the registered biometric as determined by a processing unit. In response to the identification confirmation, the electronic device may be unlocked and the user may be permitted access to an internal memory of the electronic device.

At operation 410, a processing unit may detect a triggering event from sensor data (e.g., acceleration data from the accelerometer 228), such as described herein. For example, an accelerometer may detect an acceleration that meets or exceeds a threshold acceleration. In additional or alternative examples, an ambient light detector may measure an increased or a decreased light intensity value outside an expected value. In some embodiments, many different triggering events may be used, in combination or in isolation, in one system.

At operation 412, a processing unit may not detect a triggering event from sensor data and the electronic device may continue operating in an unlocked state. Additionally, a user may continue to interact with the electronic device. In some embodiments, the process 400 may be recursive and may continuously determine if a triggering even has occurred.

If the sensors detect a triggering event at operation 412, the system 400 may return to operation 402 and a subsequent security request may request the same biometric that was initially received by the electronic device. For example, if the electronic device received a fingerprint initially at operation 402, the electronic device may expect and may receive a fingerprint after the sensors detect a triggering event at operation 410. This operation may be referred to as a subsequent security request and/or a continuing biometric authentication. The continuing biometric authentication may be performed at a lower power state than the initial biometric authentication. If the continuing biometric authentication cannot be confirmed and/or authorized by the electronic device, the electronic device may transition to a locked state at operation 406. In this way, a continuing biometric authentication may be performed in response to triggering events. In some instances, the triggering events may correspond to a theft and/or loss of the electronic device.

FIG. 5 depicts a flowchart of a process 500 for a continuous biometric authentication during a user interaction with an electronic device. The process 500 may begin at operation 502. At operation 502, the electronic device may receive biometric information from a user of the electronic device. As discussed with respect to operation 402 in FIG. 4, the received biometric information may be, for example, a fingerprint and systems of the electronic device may capture an image, or other representation, of the fingerprint via a fingerprint sensor. At operation 502, the authentication may be done in a high-resolution mode and the captured image or other representation of a biometric may be captured with a high resolution (e.g., a high image resolution, a high audio resolution, and the like).

At operation 504, a processing unit of the electronic device may confirm and/or authenticate an identity of the user in response to the received biometric. As discussed above, the received biometric may be captured in a high resolution and may be compared with a high resolution image or other representation of a biometric previously registered in a memory of the electronic device during a registration process. If this comparison shares a threshold similarity, or if the captured representation of the received biometric otherwise sufficiently matches with the previously registered biometric representation, the user may be identified and authenticated. The comparison and/or confirmation may be performed by a processing unit of the electronic device.

If the captured representation of the received biometric at operation 504 does not match with a previously registered representation of a biometric, as determined by a processing unit, or if the user is otherwise not validated, the electronic device may restrict access to an internal memory thereof and may remain or transition to a locked state, as shown at operation 516. As discussed herein, while in a locked state, information or data stored within the electronic device or otherwise available via the electronic device may be restricted or reduced until proper authentication is received.

If the captured representation of the received biometric at operation 502 does match, shares a sufficient similarity with, or otherwise sufficiently corresponds with the representation of a registered biometric, as determined by a processing unit, the user may have their identity confirmed and may be authenticated. At operation 506, after the user's identity is confirmed and/or authenticated, the electronic device may transition to an unlocked state and the user may interact with secured portions of the electronic device.

At operation 508, the electronic device detects an additional biometric at a biometric sensor. The additional biometric may be detected by the same biometric sensor in operation 502 (e.g., a fingerprint sensor) or may be a different modality of biometric (e.g., facial geometry detected by a facial scan). The additional biometric may be detected when a biometric sensor determines the presence of a biometric on the biometric sensor after, for example, a proximity sensor determines the presence of a user.

For example, while the electronic device is unlocked and permitting a user interaction, a biometric sensor may detects the presence of a biometric (e.g., a fingerprint on a fingerprint sensor or a face detected by an optical sensor). The biometric detection at operation 508 may be performed in a low-resolution mode with respect to the initial biometric detection at operation 504. For example, a biometric sensor may be in a "stand-by" mode and may capture lower resolution images or representations of input biometrics. In this way, less power may be used during subsequent biometric detection processes to extend a battery life of the electronic device. In some embodiments, the biometric detection at operation 508 may be performed at a full resolution state if the electronic device has sufficient power (e.g., by being plugged into an electrical outlet or by having a full battery charge) or if directed to by certain settings.

At operation 510, an additional biometric is not detected by a biometric sensor. For example, no finger may be input to a fingerprint sensor or no facial geometry may be detected by an optical sensor. If no biometric is detected, it may be determined whether a threshold time has passed. The threshold time may measure a period since previous biometric information was received. For example, if biometric information is received at operation 502, a countdown timer may be initiated. The countdown timer may be for any period of time and may, in some embodiments, be sixty seconds. At operation 510, it is determined whether the threshold time has passed.

If the threshold time has not passed (e.g., the countdown timer has not reached '0'), the electronic device may remain unlocked and may continue permitting a user interaction. If the threshold time has passed (e.g., the countdown timer has reached '0'), the electronic device may transition to a locked state and may prevent a user from accessing secured information. In some embodiments, when the threshold time has passed, an alert may be presented to the user to enter a biometric input. For example, a tone, pop-up box, a vibration, and the like may be generated and may inform a user that the electronic device will lock unless a biometric input is received. A countdown time may be initiated and/or controlled by a processing unit or clock.

At operation 512, an additional biometric is detected by a biometric sensor and the additional biometric is received by the biometric sensor. As discussed with respect to operation 502, the received biometric may be captured in the form of, for example, image or other representative data.

At operation 514, an identification confirmation and/or authentication procedure is performed by, for example, a processing unit. As discussed above, the received biometric may be captured in a high resolution and may be compared with a high resolution image or other representation of a biometric previously registered in a memory of the electronic device during a registration process. If this comparison shares a threshold similarity, or if the captured representation of the received biometric otherwise sufficiently matches with the previously registered biometric representation, the user may be identified and authenticated. If the comparison results in a similarity below a threshold or if the captured representation of the received biometric is otherwise sufficiently distinct from the registered biometric representation, the identity of the user is not confirmed and an authorization process fails. If no biometric is received at operation 512, the user's identity may not be confirmed and the electronic device may be locked at operation 516.

If the identification confirmation fails, the electronic device may transition to a locked state as depicted at operation 516. If the identification confirmation confirms the user's identity corresponds to the previously registered user, the electronic device may remain unlocked and may permit user access to an internal memory thereof at operation 518. In some embodiments, once the user's identity is confirmed/reconfirmed at operation 514, additional identification processes may be continuously performed (e.g., the process 500 returns to operation 506). Continuous biometric operations may be periodically performed during the entire time that the electronic device is in an unlocked state.

FIG. 6 depicts a flowchart of a process 600 of a security and lost device location procedure. The process 600 may begin at operation 602. At operation 602, the electronic device may transition to, or may remain in, an unlocked state and may permit a user interaction with a secured portion of the electronic device. The electronic device may be in the unlocked state via, for example, a biometric authentication process as discussed herein. In some embodiments, the electronic device may receive a registered password (e.g., a string of characters or a biometric password) to unlock the electronic device. In some embodiments, the electronic device may be continuously presented in an unlocked state until a triggering event is detected, as discussed herein.

At operation 604 a triggering event may be detected by, for example, a processing unit via information from an accelerometer or other user interface devices as depicted in FIG. 2. For example, an environmental sensor may detect a change in temperature (e.g., a change in temperature falling outside an expected value) and/or a GPS receiver may determine that the electronic device is in an unusual (e.g., not typically visited) location. In some embodiments, an accelerometer may determine that the electronic device is undergoing a threshold acceleration. If no triggering event is detected by the processing unit, the electronic device may remain unlocked and a user may continue interacting with secured portions of the electronic device (e.g., at operation 602). In some embodiments, a triggering event may be determined in response to signals from multiple sensors and/or user interface devices.

At operation 606, a triggering event is detected and the electronic device transitions from an unlocked state to a locked state. In some embodiments, the triggering event may be indicative of a theft or a loss of the electronic device and may therefore prevent user access to secured portions within the electronic device.

At operation 608, sensors (e.g., a fingerprint sensor) may attempt to gather biometric data from a user. For example, an optical sensor may attempt to detect a face of a user and/or a fingerprint sensor may attempt to detect fingerprint information.

At operation 610, the electronic device may confirm and/or authenticate an identity of the user in response to the received biometric. In some embodiments, no biometric may be detected at operation 608. In this event, the process 600 may continue to operation 614, as discussed below.

As discussed with respect to FIGS. 4 and 5, the received biometric may be captured in a high resolution and may be compared with a high resolution image or other representation of a biometric previously registered in a memory of the electronic device during a registration process. If this comparison shares a threshold similarity, or if the captured representation of the received biometric otherwise sufficiently matches with the previously registered biometric representation, the user may be identified and authenticated.

At operation 612, the user's identity is confirmed (e.g., the biometric information measured at operation 608 sufficiently matches preregistered biometric information) and the electronic device may transition to an unlocked state where secured information is available to a user of the electronic device. In some embodiments, the electronic device may continue in the unlocked state until an additional or subsequent triggering event is detected.

At operation 614, the measured biometric information does not sufficiently match with preregistered biometric information and an identity of the user may not be confirmed. In this situation, it is possible that the electronic device has been stolen or lost. Systems of the electronic device (e.g., a processor and a camera) may capture image data of an area surrounding the electronic device (e.g., a picture) and may then transmit the image data and location data of the electronic device (via, e.g., a GPS receiver) as part of a message sent to an authorized account. For example, during a biometric registration process, a user may enter an electronic mail address owned by the user. The image data and location data may then be sent in a message to the electronic mail address at operation 614. In some embodiments, multiple pictures may be taken by a camera of the electronic device. The pictures may be taken in quick succession or may be taken periodically. The captured pictures may then be sent to the user's electronic mail address, either at the same time or in successive or periodic electronic mail messages.

To prevent unintentional messages, the message at operation 514 may be transmitted to the authorized account after a time delay (e.g., 5 minutes) has passed. This time delay may be customizable by a user in an editable setting.

As described above, one aspect of the present technology is the gathering and use of data available from various sources to provide, for example, biometric authentication (e.g., fingerprint and/or facial recognition). The present disclosure contemplates that, in some instances, this gathered data may include personal information data that uniquely identifies, may be used to identify and/or authenticate, or can be used to contact or locate a specific person. Such personal information data can include facial information, demographic data, location-based data, telephone numbers, electronic mail addresses, home addresses, date of birth, or any other identifying or personal information.

The present disclosure recognizes that the use of such personal information data, in the present technology, can be used to the benefit of users. For example, biometric data may be used to secure an electronic device and may be used to prevent unauthorized users from accessing secured portions of an electronic device.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A method of securing an electronic device, comprising:
receiving, at a biometric sensor of the electronic device, a first biometric at a first time;
generating a first digital representation of the first biometric;
comparing the first digital representation with a previously registered biometric;
unlocking the electronic device in response to the first digital representation sharing a threshold similarity with the previously registered biometric;
detecting a data value associated with a triggering event with a second sensor of the electronic device, the second sensor different from the biometric sensor and the data value being above a threshold value;
initiating a timer in response to the data value being above the threshold value, the timer being associated with a predetermined time period;
determining that the predetermined time period has passed;
presenting an alert on the electronic device in response to the predetermined time period having passed that includes a request for additional biometric input;
receiving, at the electronic device and in response to the request for the additional biometric input, a second biometric at a second time;
generating a second digital representation of the second biometric, the second digital representation of the second biometric having a lower resolution than the first digital representation of the first biometric;
comparing the second digital representation with the previously registered biometric; and
determining whether the second digital representation shares the threshold similarity with the previously registered biometric.

2. The method of claim 1, further comprising locking the electronic device and preventing access to an internal storage of the electronic device when the second digital representation does not share the threshold similarity with the previously registered biometric.

3. The method of claim 2, further comprising:
capturing, from a camera of the electronic device, an image when the second digital representation does not share the threshold similarity with the previously registered biometric; and
transmitting a message to an account associated with the previously registered biometric, the message comprising:
current location information of the electronic device; and
the image.

4. The method of claim 1, wherein:
the second sensor is an accelerometer; and
the triggering event occurs when an acceleration of the electronic device surpasses a gravitational acceleration.

5. The method of claim 1, wherein:
the second sensor is a camera or a light sensor; and
the triggering event occurs when light detected by the camera or light sensor falls below a threshold value.

6. The method of claim 1, further comprising:
keeping the electronic device unlocked when the second digital representation shares the threshold similarity with the previously registered biometric;
initiating a timer at the second time, the timer associated with a predetermined time period; and
initiating performing a security procedure after the predetermined time period has passed.

7. The method of claim 1, wherein the first biometric and the second biometric are at least one of a vocal pattern, a fingerprint, a palm print, a facial geometry, an eye pattern, a retina pattern, a signature, or a vein pattern.

8. A method for providing a biometric authentication, comprising:
registering a first digital representation of a first biometric of a user in a memory of a mobile device;
establishing the first digital representation as a password for the mobile device;
initiating a timer associated with a predetermined time period;
determining that the predetermined time period has passed;

presenting an alert on the mobile device in response to the predetermined time period having passed that includes a request for additional biometric input;
receiving a second biometric at a biometric sensor of the mobile device;
generating a second digital representation of the second biometric;
comparing the first digital representation of the first biometric with the second digital representation of the second biometric;
permitting access to the memory when the first digital representation of the first biometric and the second digital representation of the second biometric share a threshold similarity;
detecting an acceleration of the mobile device; and
receiving a third biometric in response to the detected acceleration surpassing a threshold acceleration, the third biometric received at a lower power than the second biometric.

9. The method of claim 8, wherein the method further comprises:
generating a third digital representation of the third biometric;
comparing the first digital representation of the first biometric with the third digital representation of the third biometric; and
blocking access to the memory when the first digital representation and the third digital representation do not share the threshold similarity.

10. The method of claim 9, further comprising:
when the third biometric is received, determining a location of the mobile device; and
transmitting a message to an account associated with the user, the message containing the location of the mobile device.

11. The method of claim 8, further comprising:
generating a third digital representation of the third biometric;
comparing the first digital representation of the first biometric with the third digital representation of the biometric; and
continuing to permit access to the memory when the first digital representation of the first biometric and the third digital representation of the third biometric share the threshold similarity.

12. The method of claim 11, wherein the third digital representation has a lower resolution than the second digital representation.

13. The method of claim 8, wherein:
the biometric sensor is at least one of a fingerprint sensor, a palm print sensor, a camera, an image sensor, a microphone, a LIDAR detector, or a touch sensitive display; and
the first biometric and the second biometric include at least one of a fingerprint, a palm print, a retina pattern, a facial geometry, a vocal pattern, a vein pattern, or a signature.

14. An electronic device, comprising: a non-transitory storage medium that stores instructions;
a biometric sensor configured to receive image information from a user;
a device sensor configured to detect a triggering event with respect to the electronic device; and
a processor that executes the instructions to:
perform an initial biometric authentication of the user, the initial biometric authentication performed using a first amount of power:
after authenticating the user, allow the user to access a function of the electronic device;
after allowing the user to access the function of the electronic device, receive an acceleration value of the electronic device from the device sensor;
determine the acceleration of the electronic device is above a gravitational acceleration;
initiating a timer associated with a predetermined time period;
determining that the predetermined time period has passed;
presenting an alert on the electronic device in response to the predetermined time period having passed that includes a request for additional biometric input;
in response to the request for the for additional biometric input, receiving a biometric of the user via the biometric sensor, the biometric acquired using a second amount of power, the second amount of power lower than the first amount of power; and
compare the biometric with a previously registered biometric.

15. The electronic device of claim 14, wherein the processor is further configured to restrict access to the electronic device when the biometric does not match the previously registered biometric.

16. The electronic device of claim 15, wherein the processor is further configured to store a location of the electronic device.

17. The electronic device of claim 16, wherein the processor is further configured to transmit the location of the electronic device to an external server when the biometric does not match the previously registered biometric.

18. The electronic device of claim 14, wherein the processor is further configured to permit access to the electronic device when the biometric matches the previously registered biometric.

19. The method of claim 1, wherein the alert includes at least one of a tone, a pop-up box, or a vibration, the alert informing a user that the electronic device will lock unless the additional biometric input is received.

20. The electronic device of claim 14, wherein the alert includes at least one of a tone, a pop-up box, or a vibration, the alert informing a user that the electronic device will lock unless the additional biometric input is received.

* * * * *